(12) United States Patent
Sonthonnax et al.

(10) Patent No.: US 11,275,258 B2
(45) Date of Patent: Mar. 15, 2022

(54) SPECTACLE FRAME WITH TEMPLE ORIENTATION ACCORDING TO A PLURALITY OF PLANES

(71) Applicants: JAPAN OPTICAL CO., LTD, Ogaki Ritto (JP); Alexandre Sonthonnax, Geneva (CH)

(72) Inventors: Alexandre Sonthonnax, Geneva (CH); Tatsuro Kimura, Ogaki Ritto (JP)

(73) Assignees: Alexandre Sonthonnax, Geneva (CH); JAPAN OPTICAL Co., Ltd, Shiga (JP)

( * ) Notice: Subject to any disclaimer, the term of this patent is extended or adjusted under 35 U.S.C. 154(b) by 146 days.

(21) Appl. No.: 16/479,039

(22) PCT Filed: Jan. 29, 2018

(86) PCT No.: PCT/FR2018/050190
§ 371 (c)(1),
(2) Date: Jul. 18, 2019

(87) PCT Pub. No.: WO2018/146396
PCT Pub. Date: Aug. 16, 2018

(65) Prior Publication Data
US 2019/0361265 A1    Nov. 28, 2019

(30) Foreign Application Priority Data
Apr. 25, 2017  (FR) ....................... 1753594

(51) Int. Cl.
*G02C 5/22*    (2006.01)
(52) U.S. Cl.
CPC ......... *G02C 5/2263* (2013.01); *G02C 5/2236* (2013.01); *G02C 2200/30* (2013.01)
(58) Field of Classification Search
CPC ... G02C 5/2245; G02C 5/2263; G02C 5/2236
(Continued)

(56) References Cited

U.S. PATENT DOCUMENTS

| 4,005,930 A | * | 2/1977 | Guenin | G02C 5/2245 |
| | | | | 351/113 |
| 5,018,242 A | * | 5/1991 | Guy | G02C 5/2236 |
| | | | | 16/228 |

(Continued)

FOREIGN PATENT DOCUMENTS

| EP | 0137885 A1 | 4/1985 |
| FR | 2609816 A1 | 7/1988 |

(Continued)

OTHER PUBLICATIONS

International Search Report issued in PCT Patent Application No. PCT/FR2018/050190 dated Mar. 21, 2018.

*Primary Examiner* — Zachary W Wilkes
(74) *Attorney, Agent, or Firm* — Marshall, Gerstein & Borun LLP

(57) ABSTRACT

A spectacle frame includes a front face and temples connected thereto by hinges. Each hinge includes a hollow attachment member, respectively rigidly connected to the front face and to the temples, and each receives a hinging member having its free end provided with a hinge pin, such that the hinge pins are perpendicular to each other. The attachment members define a cylindrical sheath. The hinging members each include a rod, intended to be received in the respective sheath, one of the ends of the rod being provided with an abutment and the other end being provided with the hinge pin, each of the rods receiving a sliding ring submitted to the action of a spring bearing against the abutment, the ring being rigidly connected to the corresponding attachment member near its free end. The hinge pins of the hinging members are rigidly connected to each other by a connection member.

6 Claims, 13 Drawing Sheets

(58) Field of Classification Search
USPC .......................... 351/153, 115, 117; 16/228
See application file for complete search history.

(56) References Cited

U.S. PATENT DOCUMENTS

| | | | | |
|---|---|---|---|---|
| 5,115,540 A * | 5/1992 | Delorme | ............... | G02C 5/2209 16/228 |
| 6,152,562 A * | 11/2000 | Montalban | ............ | G02C 5/2227 16/228 |
| 6,336,251 B1 * | 1/2002 | Sartor | .................. | G02C 5/2236 16/228 |
| 6,353,965 B1 * | 3/2002 | Lo | ........................ | G02C 5/2236 16/228 |
| 7,077,518 B1 * | 7/2006 | Lee | ....................... | G02C 5/2236 16/228 |
| 7,222,960 B2 * | 5/2007 | Thiele | ................... | G02C 5/2236 16/228 |
| 7,318,252 B2 * | 1/2008 | Chang | .................. | G02C 5/2236 16/228 |
| 7,380,935 B2 * | 6/2008 | Ifergan | ................. | G02C 5/2263 351/153 |
| 7,637,609 B1 * | 12/2009 | Ifergan | ..................... | G02C 5/10 16/228 |
| 7,874,042 B2 * | 1/2011 | Buchegger | ........... | G02C 5/2245 16/228 |
| 8,757,796 B2 * | 6/2014 | Delamour | ............ | G02C 5/2236 351/121 |
| 9,459,466 B2 * | 10/2016 | Wang | ..................... | G02C 5/146 |
| 10,365,501 B2 * | 7/2019 | Yang | ..................... | G02C 5/2245 |
| 2003/0020867 A1 * | 1/2003 | Dei Negri | ............ | G02C 5/2245 351/153 |
| 2006/0179609 A1 * | 8/2006 | Huang | .................. | G02C 5/2236 16/228 |
| 2009/0047061 A1 * | 2/2009 | Chene | ................... | B25J 17/0258 403/65 |
| 2017/0139229 A1 * | 5/2017 | Montalban | ............ | E05D 3/022 |

FOREIGN PATENT DOCUMENTS

| | | |
|---|---|---|
| FR | 2737020 A1 | 1/1997 |
| FR | 2942889 A1 | 9/2010 |
| FR | 3001052 A1 | 7/2014 |
| WO | WO-2007/045742 A1 | 4/2007 |
| WO | WO-2008/012683 A2 | 1/2008 |
| WO | WO-2008/031204 A1 | 3/2008 |

* cited by examiner

SPECTACLE FRAME WITH TEMPLE ORIENTATION ACCORDING TO A PLURALITY OF PLANES

TECHNOLOGICAL FIELD

The present disclosure concerns the field of spectacle frames.

More specifically, the disclosure relates to a spectacle frame having temples which may be oriented and in particular displaced according to at least two different planes.

BACKGROUND

Conventionally, a spectacle frame is formed of a front face, receiving the optical or solar lenses, the front face being substantially oriented in a vertical plane when the frame is being worn by a user. Temples are hinged on the front face, so that said temples can be opened, to allow the positioning of the frame on the wearer's face, and, as a corollary, the closing or the folding back of the temples against said front face, in particular to enable to store the frame in a pocket or in a case.

To increase the wearer's comfort and the proper holding of the frame on the wearer's face, and, as a corollary, to optimize the mechanical resistance of the frame, it is known to provide said temples with some resilience, either inherent to the material forming the actual temple, or resulting from the hinging of said temple on the front face. Such a resilience particularly enables to displace the temples beyond the position of stable opening of the temples, conventionally resulting from the cooperation of the base of the temples with an abutment formed on the front face.

Many resilient hinges have thus been described, such as for example in documents EP 0 137 885 or FR 2 609 816.

Another problem encountered with spectacle frames is their relative fragility to shocks and other incidental mechanical stress, capable of resulting in a deformation of the front face and an alteration of the parallelism between the temples and their respective position relative to the front face.

To overcome this issue, spectacle frames having temples capable of also displacing according to a plane, called transverse plane hereafter, that is, according to a plane substantially perpendicular to the vertical plane containing the front face, and to a horizontal plane, corresponding to the conventional plane of angular motion of the temples with respect to said front face to allow the opening or the folding back of the temples, have been provided. Such frame have for example been described in documents FR 2 942 889 or FR 3 001 052.

Whatever the elements implemented to reach such a double degree of liberty of angular motion of the spectacle temples, it can be observed that the means for reaching such a result are relatively complex to implement, and tend to increase the weight of the actual frame, generating an oversizing either of the spectacle temples, or of the lugs coming out of the front face, and thus of the actual front face.

Further, known prior art devices only allow a limited angular motion of the spectacle temples in the plane called transverse.

Further, another technical problem has to do with the stability of the temple with respect to the front face of the frame, when said temple is in open position, that is, enabling a user to wear the frame.

The presently disclosed embodiments aim at simplifying the elements to be implemented, at increasing the angular motion of the temples in said transverse plane, and at optimizing the stability of the relative positioning of the temples with respect to the front face of the frame.

SUMMARY OF THE DISCLOSURE

For this purpose, the disclosed embodiments aim at a spectacle frame comprising a front face for supporting the lenses, substantially oriented in a vertical plane when said frame is being worn, and temples connected to the front face by means of hinges, said hinges each comprising an attachment member, respectively rigidly connected to the front face of the frame and to the temples, each receiving a hinging member, having its free end provided with a hinge pin, said hinge pins being perpendicular to each other.

According to embodiments:

the attachment members are hollow and define a cylindrical sheath, the hinging members each comprise a rod, intended to be received in the respective sheath, one of the ends of the rod being provided with an abutment and the other end being provided with said hinge pin, each of the rods receiving a sliding ring or an equivalent member, submitted to the action of a spring bearing against the abutment, said ring or equivalent member being rigidly connected to the corresponding attachment member near the free end of said attachment member, the hinge pins of the hinging members being rigidly connected to each other by means of a connection member.

In other words, the disclosed embodiment comprises forming a spectacle frame provided with a resilient double hinge, the resilience resulting from the springs fitting the hinging members cooperating with the respective sliding ring (or equivalent member), excluding any cam or ball system, as described in prior art devices. The springs pull back the temple to its nominal position, that is, stable in the open position.

According to a feature of the disclosed embodiment, the free ends of the attachment members have a parallelepipedal shape.

Further, the surface of said free ends of the attachment members is flat. Thereby, when the temples are open, to enable the user to wear the frame, said surfaces are in contact with each other.

According to another feature of the disclosed embodiment, the attachment member on the front face has, on one of its lateral faces starting from the free end, a recess, and the attachment member on the temple has a protrusion emerging from its planar surface, of dimensions substantially corresponding to the width of the recess, to be received therein when the temple is open and when the temple is folded back.

Thereby, a stable positioning of the temple relative to the front face is ensured. However, due to the respective shapes of the recess and of the protrusion, said temple may be additionally opened with respect to such a stable position, and thus in the horizontal plane, to increase as reminded as a preamble the wearer's comfort and the efficient hold of the frame on the wearer.

As a variation, for the same purpose, only a portion of the surface of said free ends of the attachment members is flat, said surfaces respectively comprising protrusions and recesses of complementary shape.

BRIEF DESCRIPTION OF THE DRAWINGS

The foregoing features and advantages of the presently disclosed embodiment will now be discussed in the following non-limiting description of a specific embodiment, in relation with the accompanying drawings.

DETAILED DESCRIPTION

Figure 1:
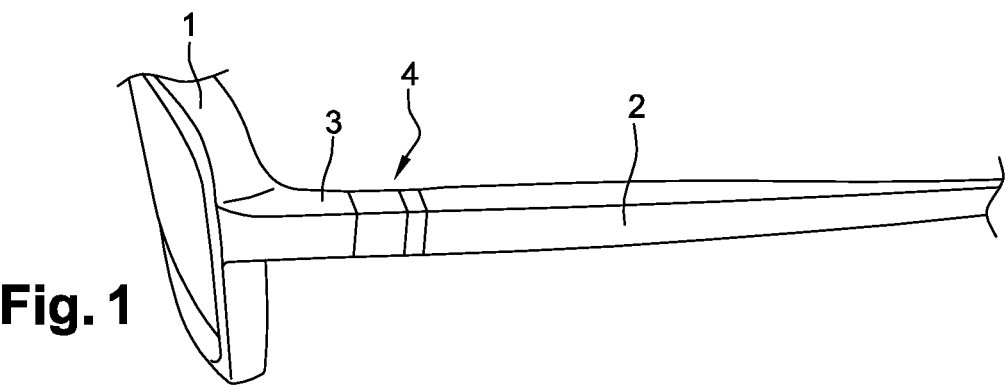
FIG. 1 is a partial simplified perspective representation of a spectacle frame is standard position with an open temple.

The spectacle frame has thus been shown in relation with FIGS. 1 to 5. The latter conventionally comprises a front face 1, receiving the lenses and typically oriented in a substantially vertical plane when the frame is being worn by the user.

The frame also comprises lateral temples 2, connected to lugs 3 extending substantially perpendicularly from front face 1 in the plane called horizontal, by means of a hinge bearing general reference numeral 4.

Figure 4:
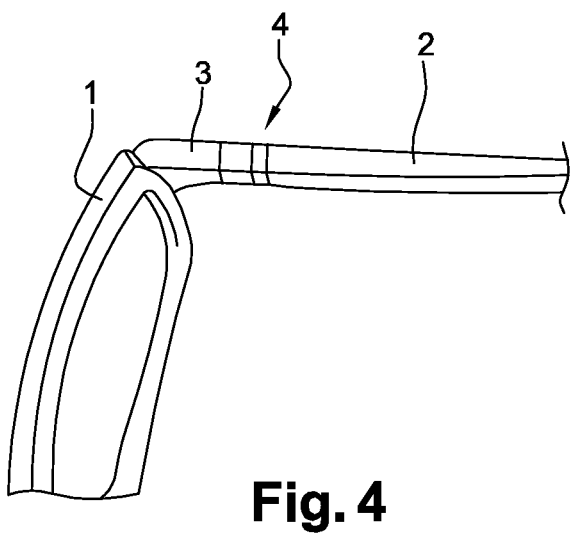
FIGS. 4 and 5 are simplified representations of the frame of FIG. 1 with an illustration (FIG. 5) of the angular motion of the branch in the horizontal plane, beyond the normal position of the temple.
Figure 5:
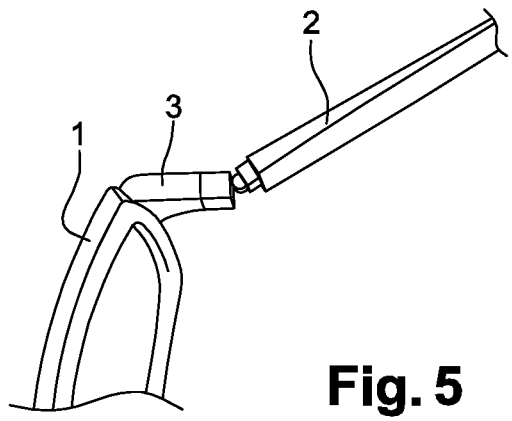

The spectacle frame is capable (see FIGS. 4 and 5) of having an angular motion of temples 2 in the horizontal plane with, further, an additional angular motion of the temple beyond its normal or stable position, illustrated in FIG. 4, which normal position corresponds to the unfolded temples to enable the user to wear the frame.

Figure 2:
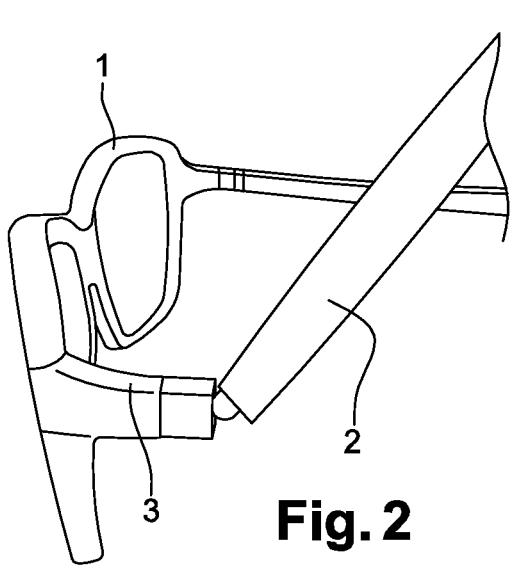
FIGS. 2 and 3 are simplified partial perspective representations of the spectacle frame of FIG. 1 with an angular motion of one of the temples in the transverse plane.
Figure 3:
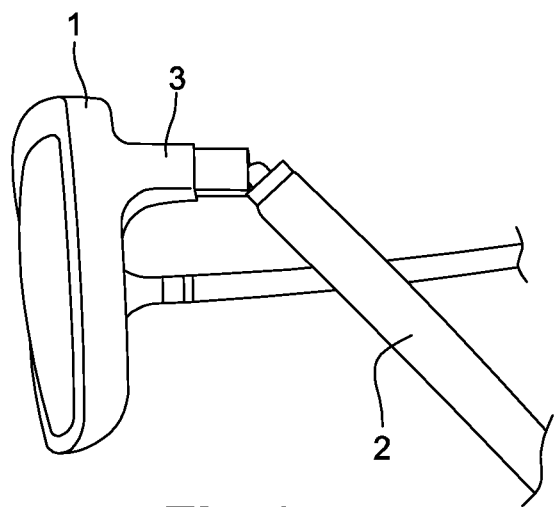

As a corollary, the temples of the spectacle frame are also capable of having an angular motion in the transverse plane illustrated at the level of FIGS. 2 and 3.

First Embodiment

Figure 6:
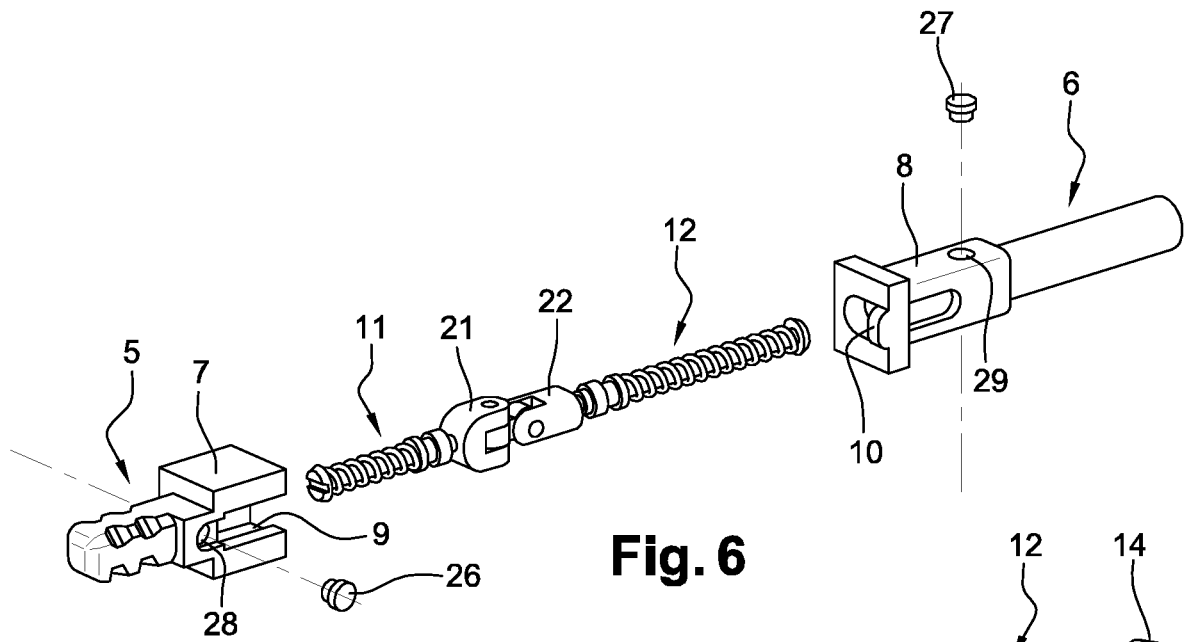
FIG. 6 is a simplified exploded representation of the hinge according to a first embodiment.
Figure 7:
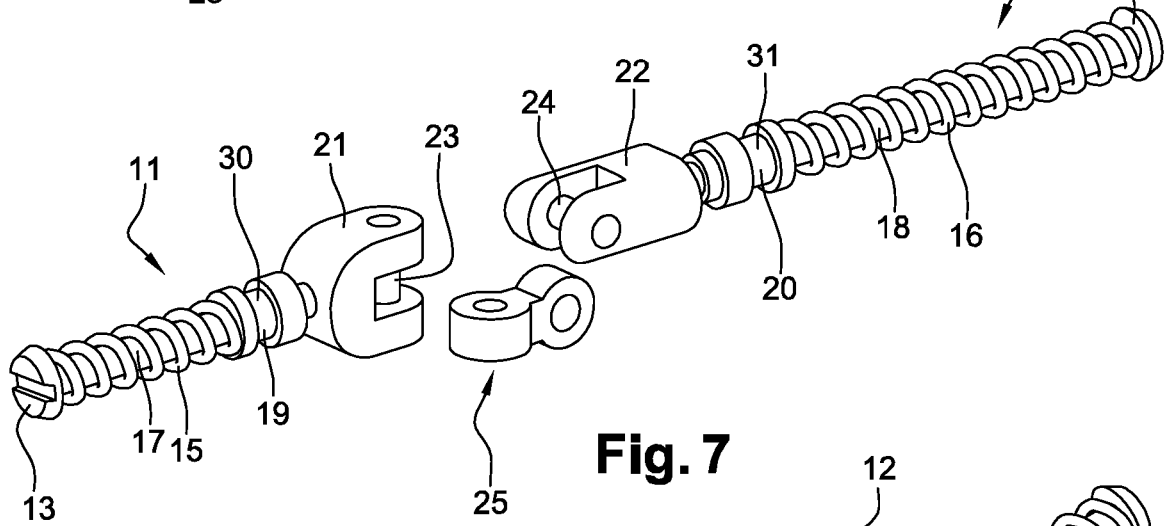
FIG. 7 is a simplified exploded representation of the hinging members of the hinge of the first embodiment.
Figure 8:
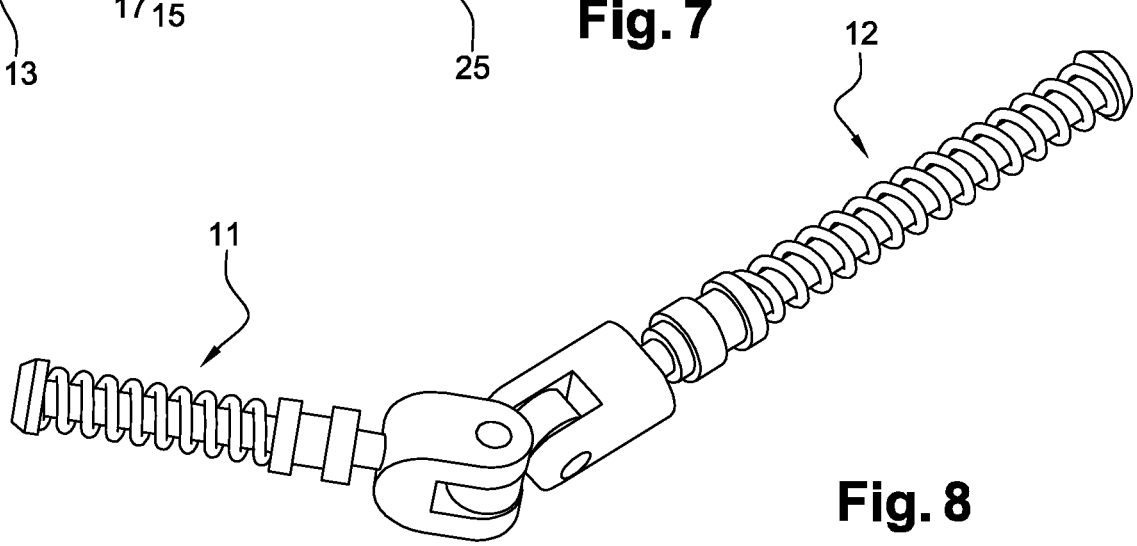
FIGS. 8 and 9 on the one hand, and 10 and 11 on the other hand illustrate the double rotating motion of the hinging members, respectively in the horizontal plane and in the transverse plane of the first embodiment.
Figure 9:
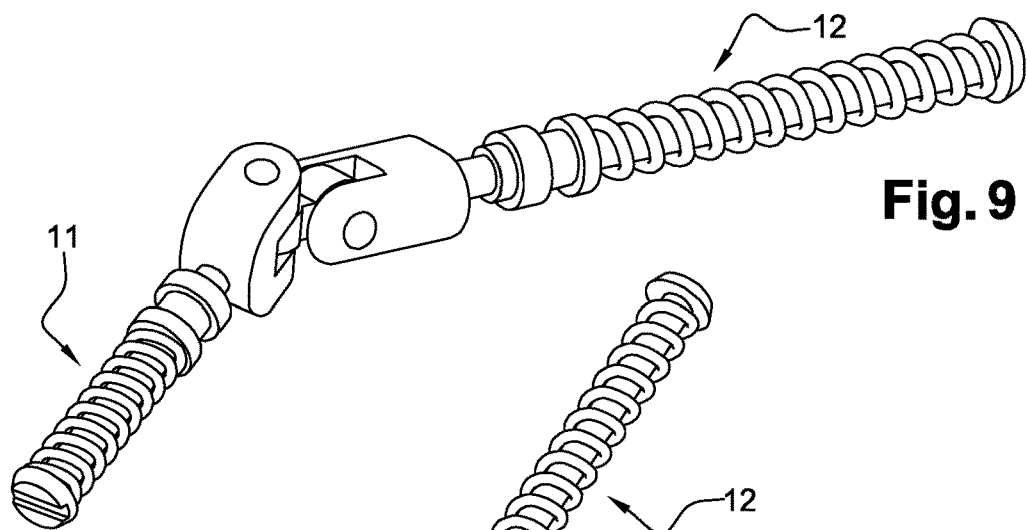
Figure 10:
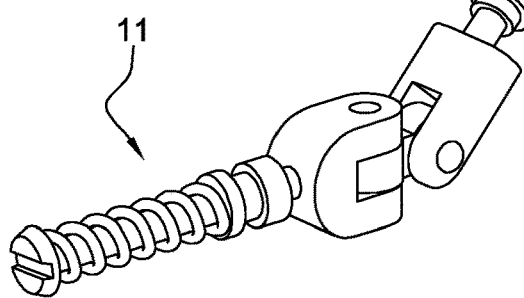
Figure 11:
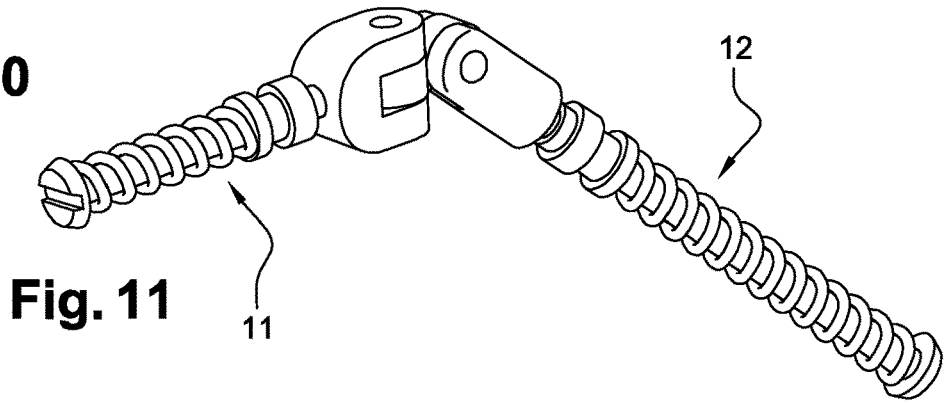

One of the aspects has been shown in FIGS. 6 and 7. Basically, hinge 4 is first formed of attachment members, respectively 5 in lug 3, and 6 in temples 2, typically made of metal, or even of a composite material.

Such attachment members are intended to be rigidly connected to lug 3 and to frame 2. Such a rigid connection may be achieved in different ways: screwing, gluing, snapping or also overmolding.

Figure 18:
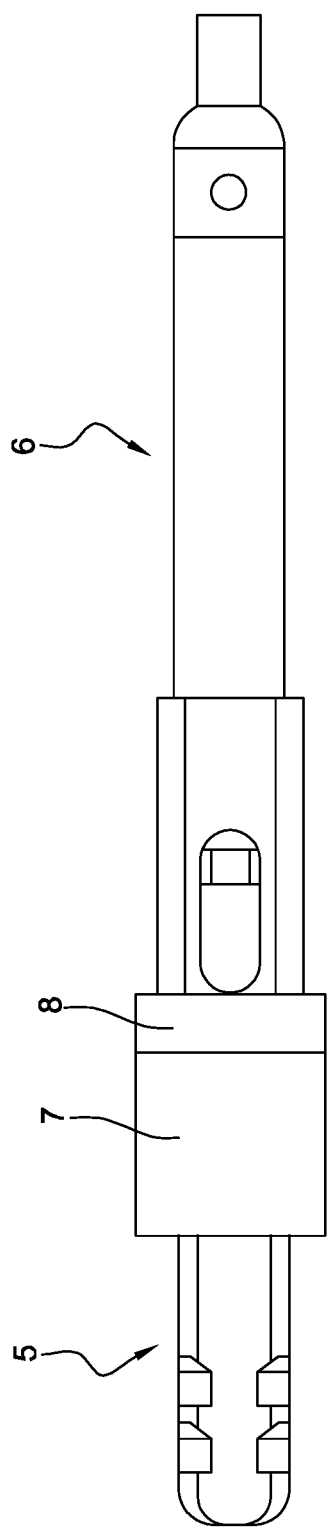
FIG. 18 schematically illustrates the attachment members when the temple is in open position and according to its stable position.
Figure 19:
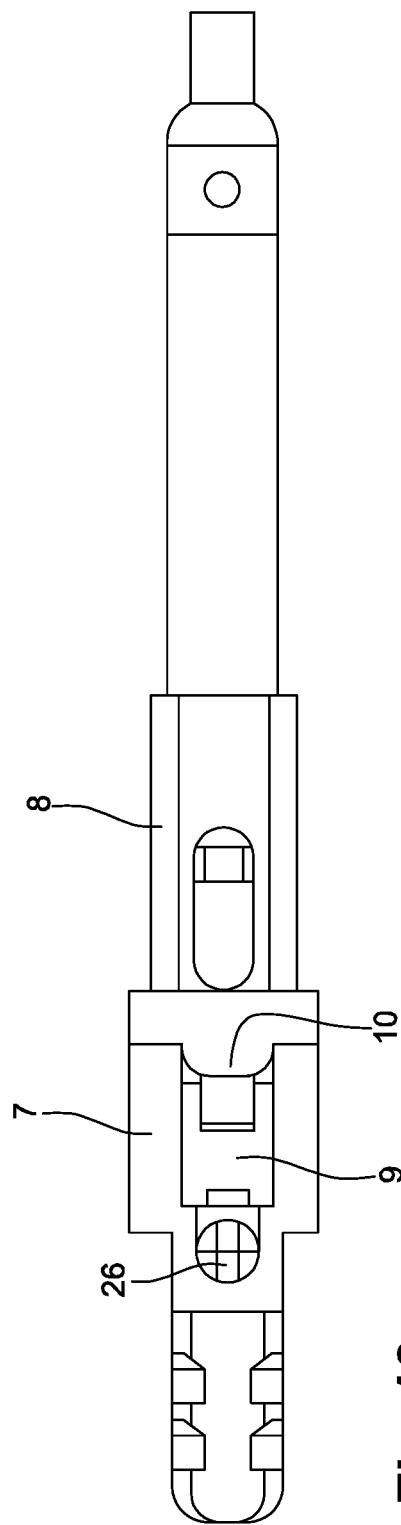
FIG. 19 is a view similar to FIG. 18 after a 180° rotation with respect to the longitudinal direction.

Their free ends (respectively 7 and 8) have, as can in particular be observed in FIG. 6, a substantially parallelepipedal shape. The free ends terminate in a planar surface, intended to come into contact with each other when the branch is in open or stable position (such as shown in FIG. 1) and such as it has actually been shown in FIGS. 18 and 19.

One of the lateral faces of free end 7 of the attachment member of lug 5 has a recess 9, in the case in point formed by an elongated opening intended to cooperate with a protrusion 10, emerging from free end 8 of attachment member 6 on temple 2. The respective dimensions of recess 9 and of protrusion 10 are thus accordingly selected to allow such a cooperation. Said cooperation may further be observed, particularly, in FIGS. 19 and 20.

Further, in the vicinity of free end 8 of attachment member 6 on temple 2, a longitudinal opening is formed.

The attachment members, respectively 5 and 6, have an elongated shape and define a sheath, intended to each receive a so-called hinging member, respectively 11 and 12 described in further detail hereafter.

Each of the hinging members is formed of a rigid rod, respectively 17 and 18, typically made of steel. Each of the rods is provided with an abutment, respectively 13 and 14 at one of its ends, the abutment having a spring, respectively 15 and 16, bearing against it.

The other end of rods 17 and 18 opposite to abutment 13, 14, receives the actual hinging elements, respectively 21 and 22, each provided with a hinge pin 23, 24. Hinge pins 23, 24 are oriented perpendicularly to each other. The hinging elements are each substantially U-shaped.

A ring, respectively 19 and 20, is capable of sliding on each of the rods. The other end of springs 15 and 16 respectively bears against the rings.

Rings 19 and 20 are rigidly connected to attachment members 5 and 6, in the vicinity of ends 13 and 14 of said members. The rigid connection is performed by means of screws 26, 27, received in a bore 28, 29 formed in said ends, the free end of said screws inserting in a groove 30, 31 formed at the periphery of said rings.

Finally, said hinging elements 21, 22 are rigidly connected to each other by means of a connection member 25. The connection member, better shown in FIG. 7, appears in the form of two disks rigidly connected to each other and pierced at their center, the perforations having axes perpendicular to each other. Said disks are intended to be received between the branches of Us defining hinging elements 21, 22, and to be crossed by hinge pins 23 and 24.

In other words, hinging members 11, 12 are rigidly connected to each other and thus cannot draw away from each other.

However, due to the presence of hinge pins 23, 24 and to the mode of rigid connection by means of connection member 25, they are hinged with respect to each other and are thus capable of having a double hinging motion in two perpendicular planes, in the case in point in a horizontal plane and in a vertical plane in the sense of the definition given to these planes in the context of the present disclosure.

In parallel, attachment members 5, 6 and accordingly the temples and the front face, are capable of displacing linearly with respect to each other.

Figure 12:
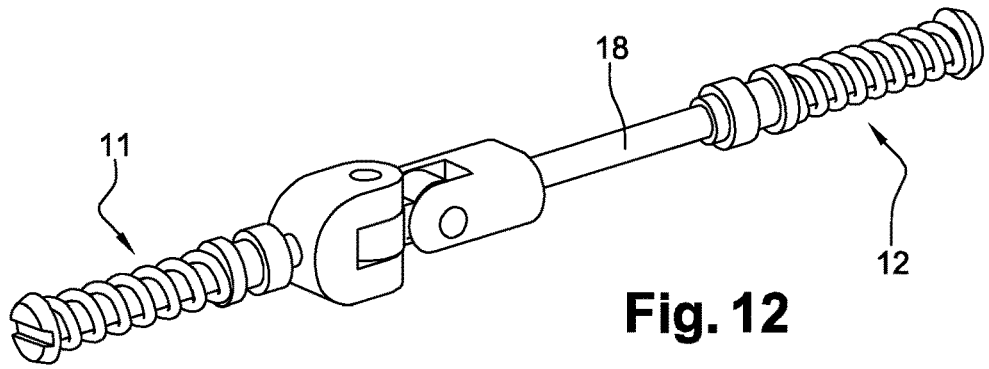
FIG. 12 is an illustration of the hinging members with a displacement of the sliding ring fitting each of them according to the first embodiment.
Figure 13:
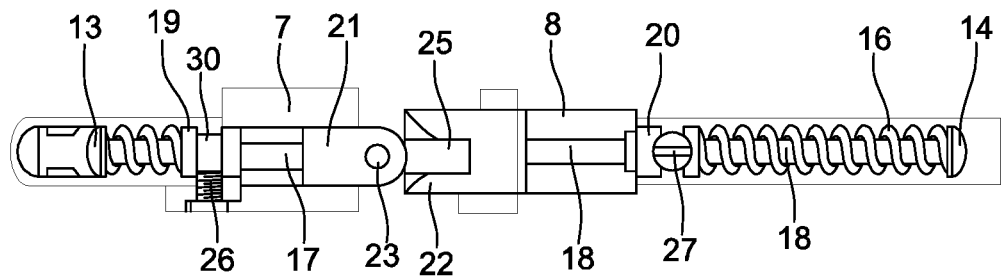
FIGS. 13 and 14 are simplified representations of said attachment and hinging members illustrating the possible extension of said attachment members according to the first embodiment.
Figure 14:
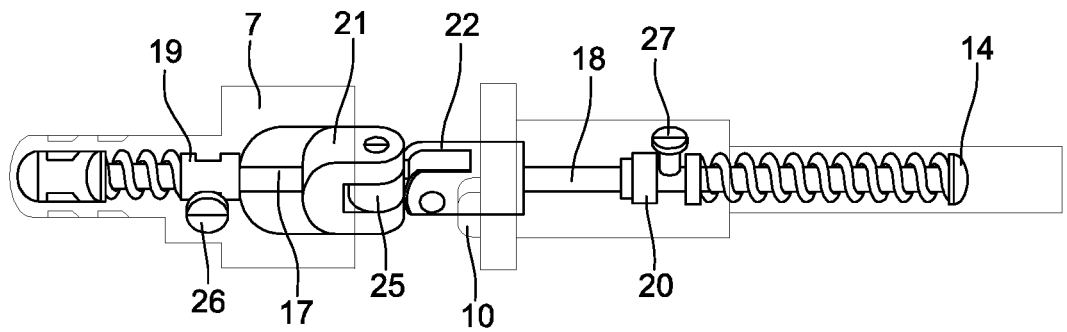
Figure 15:
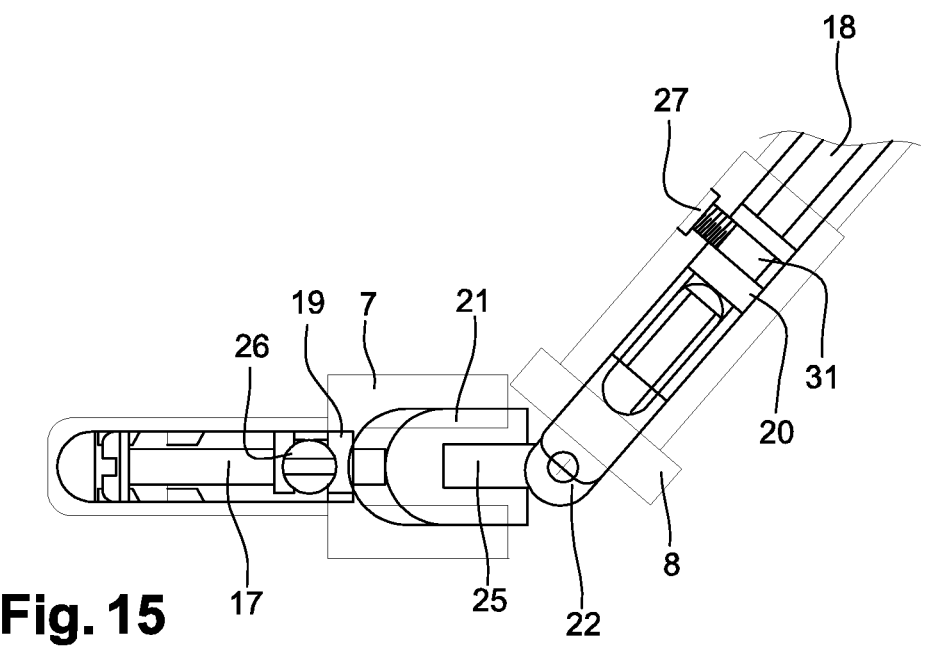
FIGS. 15 and 16 schematically illustrate the rotation of the attachment and hinging members in the vertical plane according to the first embodiment.
Figure 16:
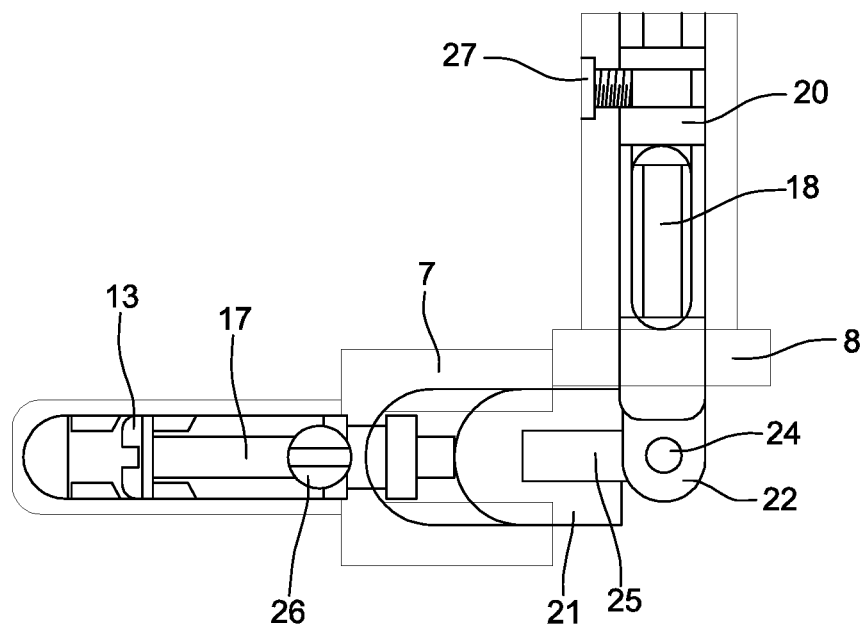

Indeed, due to the mode of rigid connection of the hinging members within the attachment members, in the case in point via screws 26, 27 cooperating with sliding rings 19, 20, it can be understood that a traction may be exerted on said hinging members, resulting in the partial extraction of the corresponding rod out of the corresponding attachment member, and accordingly in the compression of the spring of the considered rod (see FIGS. 12, 13, 14). Such a compression generates a pull-back effect, resulting, when the stress (in the case in point, the traction) has stopped, in the returning of the attachment member back to its most stable position, and thus accordingly in the returning of the temple to its nominal position, that is, in open mode (FIGS. 1 and 4).

It is sufficient to select the springs with an appropriate spring constant to have the effect thus desired, according to the desired ease of manipulation of the frame.

However, the relative displacement of the temples with respect to the lugs is affected by the specific shape of the ends of attachment members 5, 6.

Thus, in nominal or stable position of the temple with respect to the lug, that is, in open position corresponding to FIGS. 1 and 4, the planar surfaces of free ends 7 and 8 are in contact with each other. In this configuration, springs 15 and 16 are in maximum extension and, as a corollary, their compression force is minimum. This corresponds to FIGS. 18 and 19.

In this configuration, protrusion 10 is received into the end of opening 9 emerging at the level of the corresponding planar surface of end 7.

During the folding of the temple substantially parallel to the front face, to allow the storage of the frame in a case, for example, the wearer tilts the considered temple towards the front face. This motion generates a cooperation between one of the edges of end 8 of attachment member 6 and the planar surface of end 7 of attachment member 5, and accordingly the partial extraction of rods 17, 18, and thus of the hinging members out of the attachment members. A new stable position is obtained, after a rotation by 90° of the concerned temple. The stability of this position results from the cooperation of the planar surface of end 8 with the planar lateral face of end 7, contiguous to the planar surface of end 7 and having elongated opening 9 formed therein. Thereby, protrusion 10 is received in opening 9, also in this stable position.

Figure 20:
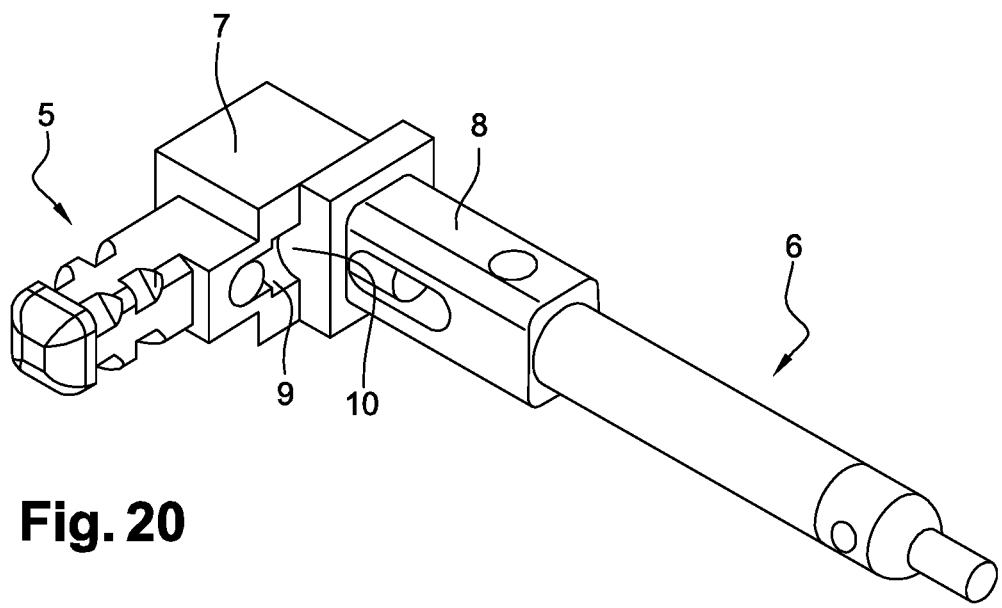
FIG. 20 is a simplified representation of the attachment members with the branch in folded position, and thus after a rotation in the horizontal plane.
Figure 21:
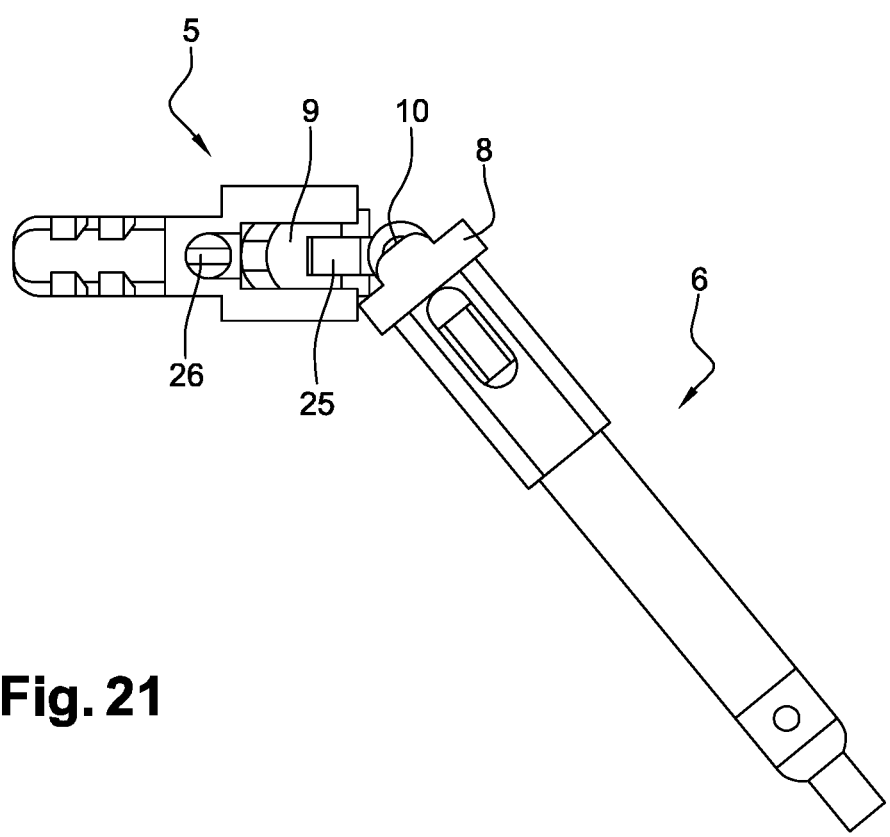
FIG. 21 illustrates the rotation of the attachment members in the transverse plane.
Figure 22:
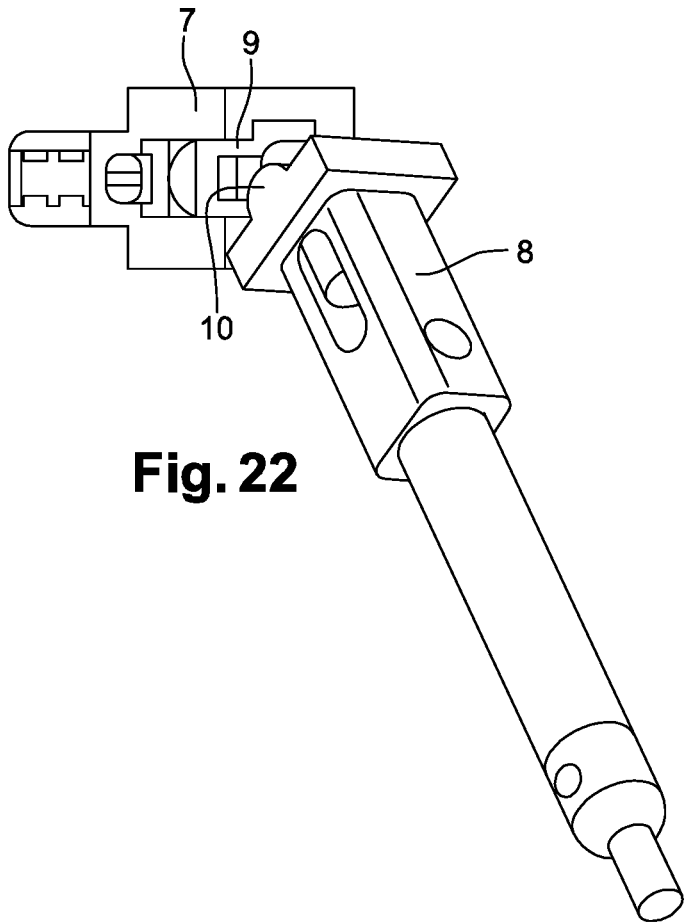
FIG. 22 is a view similar to FIG. 21, but according to another viewing angle, as well as FIG. 23.
Figure 23:
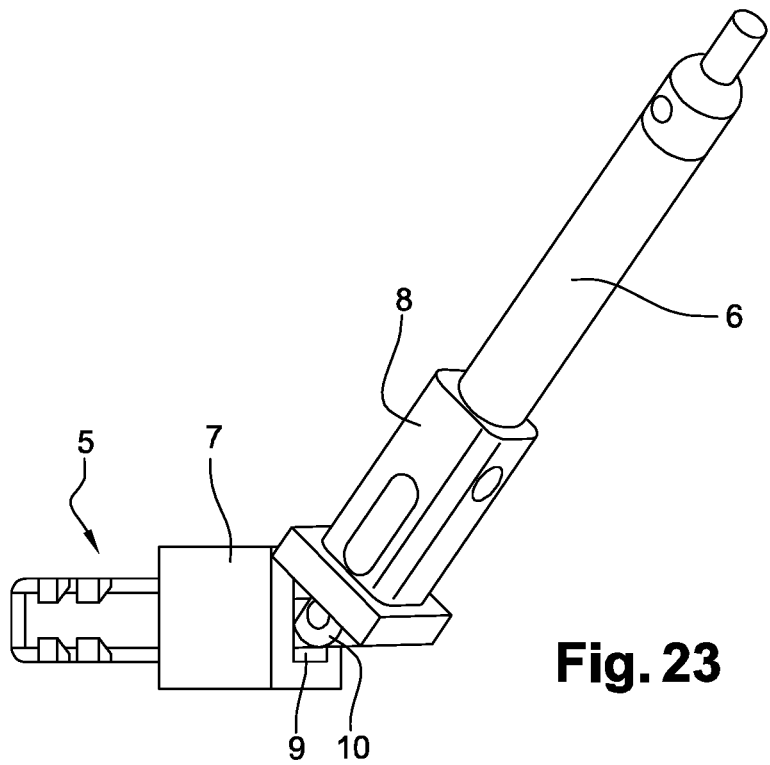
Figure 24:
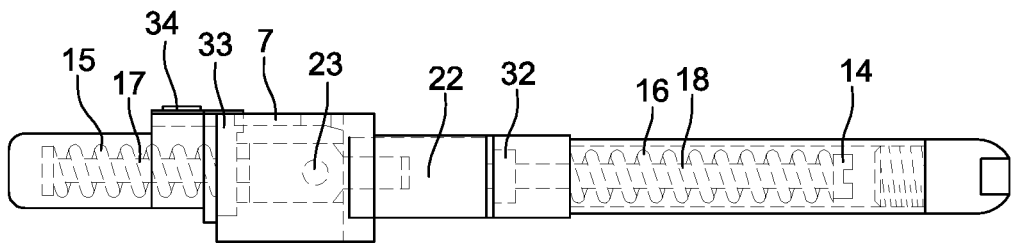
FIG. 24 is a simplified representation of the hinge in lateral view of a second embodiment.
Figure 25:
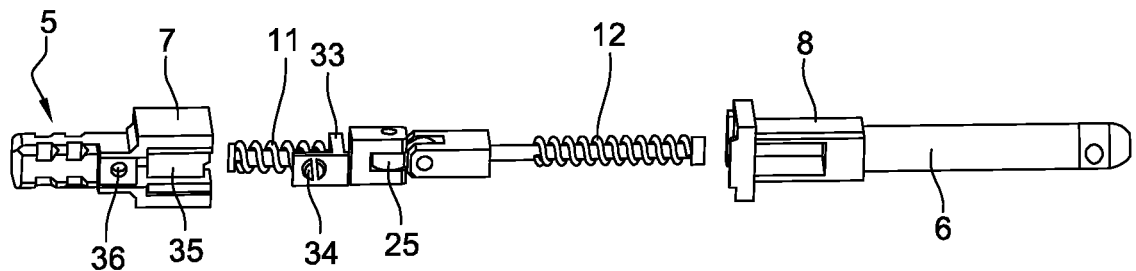
FIG. 25 is a simplified representation of the hinge of FIG. 24 in exploded view.
Figure 26:
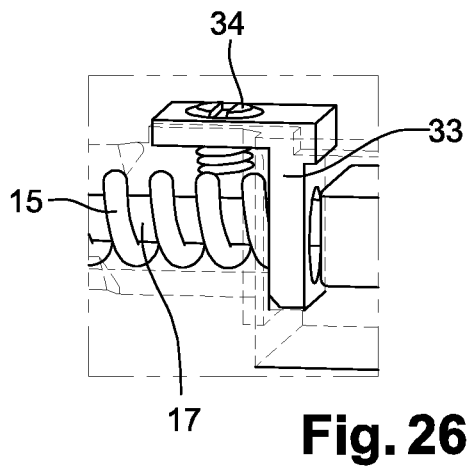
FIGS. 26 and 27 are partial simplified perspective representations of the attachment members according to the second embodiment.
Figure 27:
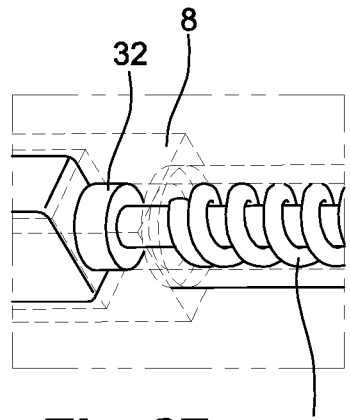

Thus, although, in such a configuration, hinging member 11 partially emerges out of attachment member 5 and accordingly generates the pull-back effect inherent to the compression of spring 15, there is a stability due to the respective shape of free ends 7 and 8 of said attachment members: see FIG. 20.

Figure 17:
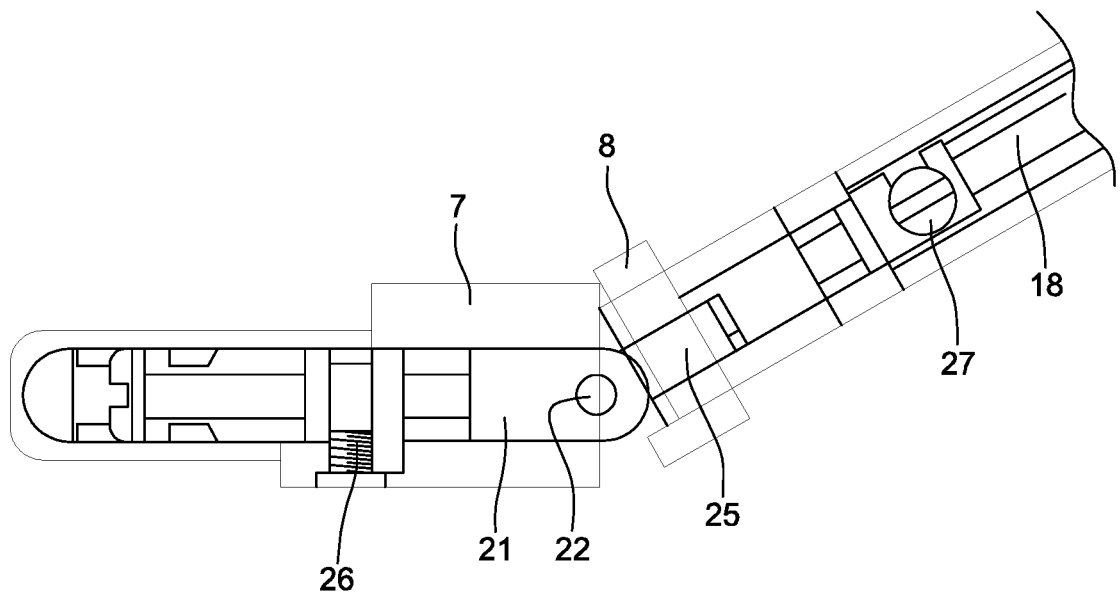
FIG. 17 schematically illustrates the rotation of said members in the horizontal plane beyond the stable open position of the temple.

The possible angular motion of the temple beyond its stable position (open temple) in the horizontal plane has been shown in relation with FIG. 17. In such a configuration, there is no stability, due to the lack of cooperation between protrusion 10 and opening 9, so that once the stress resulting from the opening of the temple beyond its stable position stops, the temple returns to its stable position under the effect of the pull-back force due to the springs acting compressively against rings 19, 20 and thus the corresponding attachment members.

Further, the temple may also be displaced in a transverse plane (FIGS. 15, 16, 21, 22, 23). Such an ability is inherent to the double hinge pin formed at the end of the hinging members. However, such an angular motion in the transverse plane comprises no stable position other than the previously-described nominal position, due, on the one hand, to the specific shape of the free ends of the attachment members and, on the other hand, to the lack of means of protrusion/recess type capable of providing such a stability.

Thus, as soon as the stress resulting from the opening of the temple in the transverse plane stops, the temple returns to its stable position.

Second Embodiment

A second embodiment has been shown in relation with FIGS. 24 to 37. Basically, the operation according to the second embodiment is identical to that of the previously-described first embodiment.

However, to simplify the members involved, on the one hand, and, accordingly, to limit the bulk generated by the hinge assembly, and to stabilize the orientation of the temples with respect to the front face of the frame on the other hand, some of said members undergo modifications, described hereafter in further detail.

Thus, to begin with, the sliding rings 19 and 20 of the first embodiment are respectively replaced, on the one hand:

with a plate 33 integrated within free end 7 of attachment member 5 rigidly connected to the front face of the frame, said plate being pierced with a through opening within which rod 17 of the corresponding hinging member 11 is capable of sliding, said plate 33 extending perpendicularly towards said front face, the extension receiving a screw 34 screwed in a threaded opening 36 formed within said free end 7, and capable of cooperating with spring 15 to be used as a point of application to said spring;

with a ring 32 rigidly connected to the base of free end 8 of attachment member 6 of temple 2, said ring being pierced at its center with a through opening capable of allowing the sliding of rod 18 of the corresponding hinging member 12, the ring being here again used as a point of application of spring 16.

Due to these modifications, the volume, and thus the corollary bulk of the attachment members, and more particularly of the free ends of said members, is decreased. Further, their forming and their assembly are thereby simplified with respect to the first embodiment.

Figure 28:
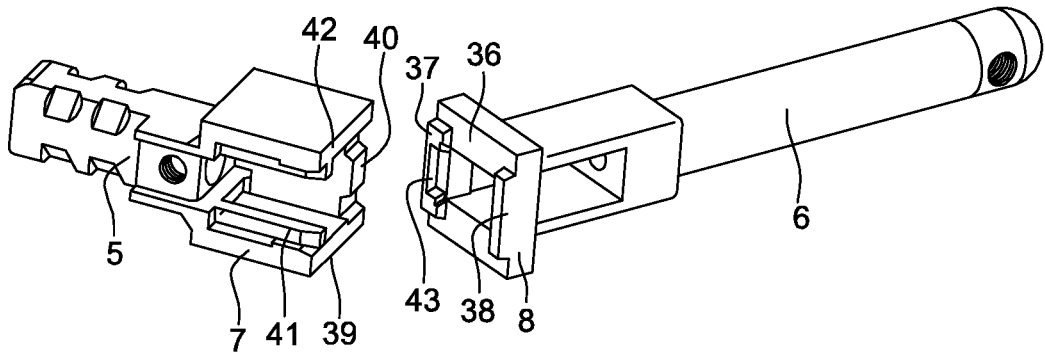
FIG. 28 is a simplified perspective representation of the hinging members according to the second embodiment.

FIG. 28 further shows a simplified view of attachment members 5 and 6.

The terminal face of end 8 of attachment member 6 has a planar surface 36, intended to come into contact with the planar surface 42 of the terminal face of end 7 of attachment member 5 when temple 2 is in open position, that is, when the frame is being worn by the user.

Further, two protrusions or raised areas, respectively 37 and 38, positioned on two opposite edges of said terminal face, emerge from said surface 36. One 37 of the protrusions is substantially U-shaped, which defines a central recess 43 intended to cooperate with a protrusion 40 emerging from one of the edges of the terminal face of end 7. The other one 38 of the protrusions is intended to cooperate with shoulders 41 formed on either side of portion 9 formed on one of the lateral faces of end 7 of attachment member 5.

Figure 29:
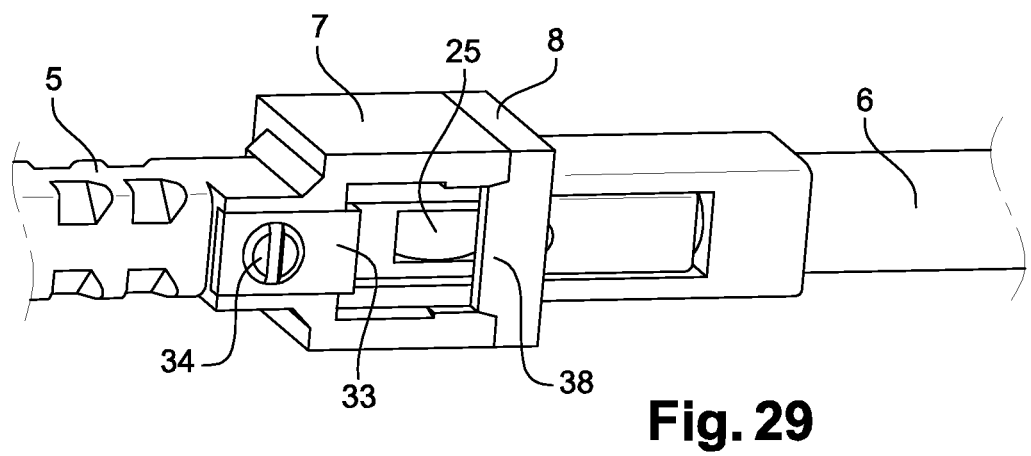
FIGS. 29 and 30 schematically illustrate the cooperation of the free ends of the attachment members according to the second embodiment, according to two views different from each other by a 180° rotation.
Figure 30:
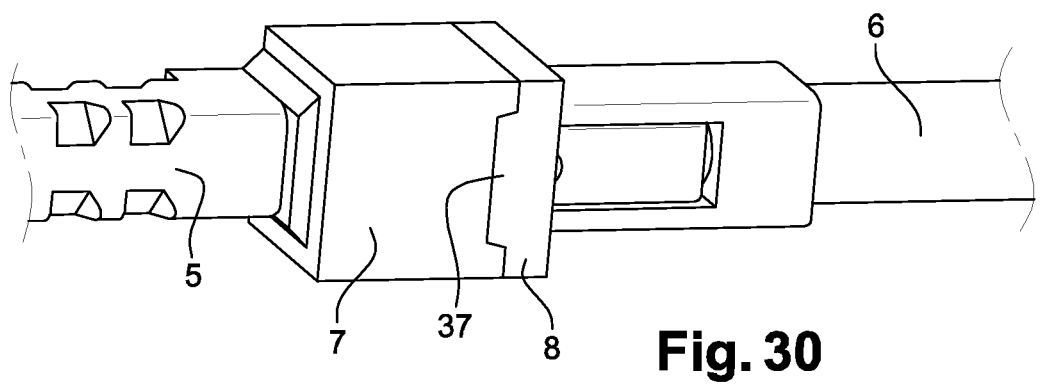
Figure 31:
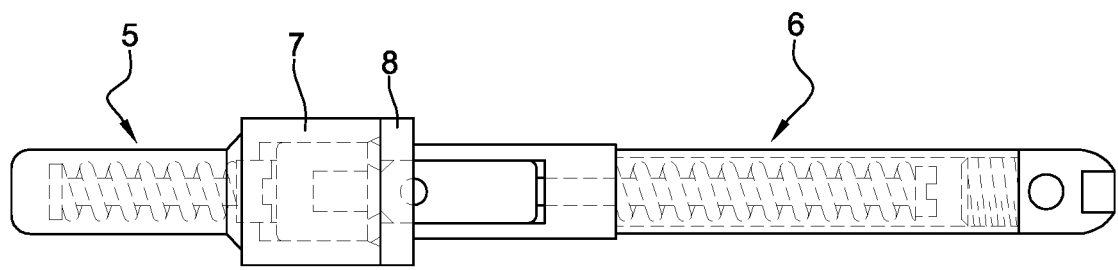
FIGS. 31 to 37 schematically illustrate in simplified fashion the cooperation of the attachment and hinging members during the rotation of the temple in the horizontal plane for different degrees of angular motion according to the second embodiment.

As can be observed in FIGS. 29, 30, and 31, when temple 2 is open, that is, when the frame is being worn by a user, the above-mentioned protrusions and recesses cooperate together, so that due to the action of springs 15 and 16, in addition to the connection between the two hinging members via connection member 25, naturally tending, that is, in the absence of any outer stress, to draw the attachment members towards each other, a real stability of this position of the temple is obtained.

FIGS. 32 to 37 further illustrate various orientations of the temple attachment member with respect to that of the front face in the horizontal plane (according to the retained terminology).

Figure 32:
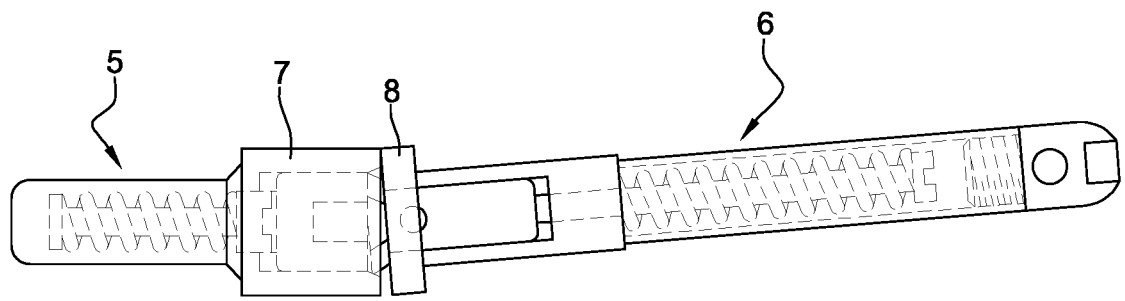
Figure 33:
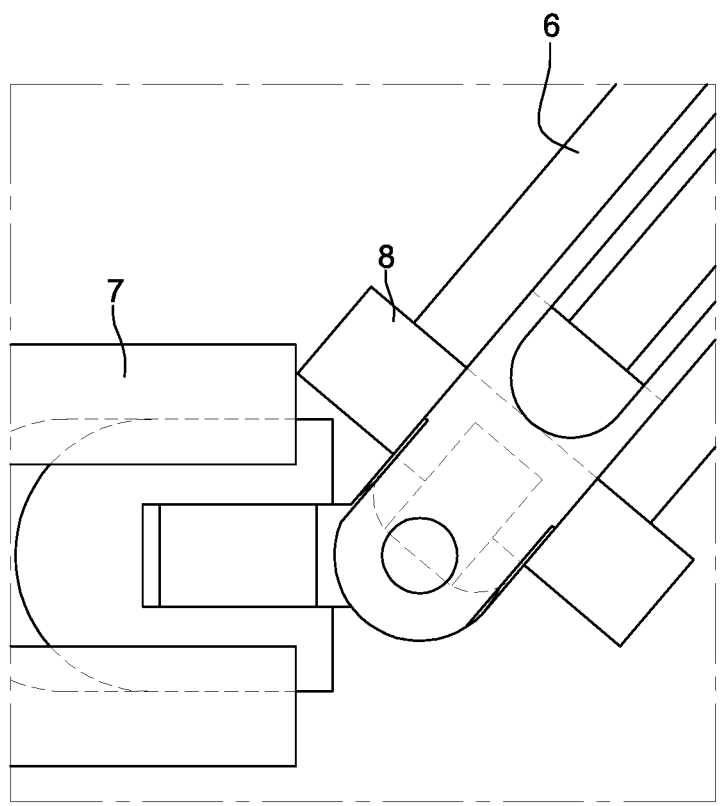

Thus, in the case of a small inclination with respect to the stable position of FIG. 31 and illustrated in FIGS. 32 and 33, it can be observed that the edge of the terminal face of the attachment member of the temple bears against the terminal face of the attachment member of the front face. Such a position is unstable, due to the action of the springs, in addition to the connection between the hinging members of the frame and of the front face.

If such a tilting of the temple is continued until its maximum travel (FIGS. 36 and 37), corresponding to the temple folded substantially parallel to the front face, it can be observed that the stability of this position results from the cooperation of the attachment member of the temple with that of the front face, by the lateral face of the end or head of the attachment member of the temple with the planar surface of the terminal face of the attachment member of the front face.

Figure 34:
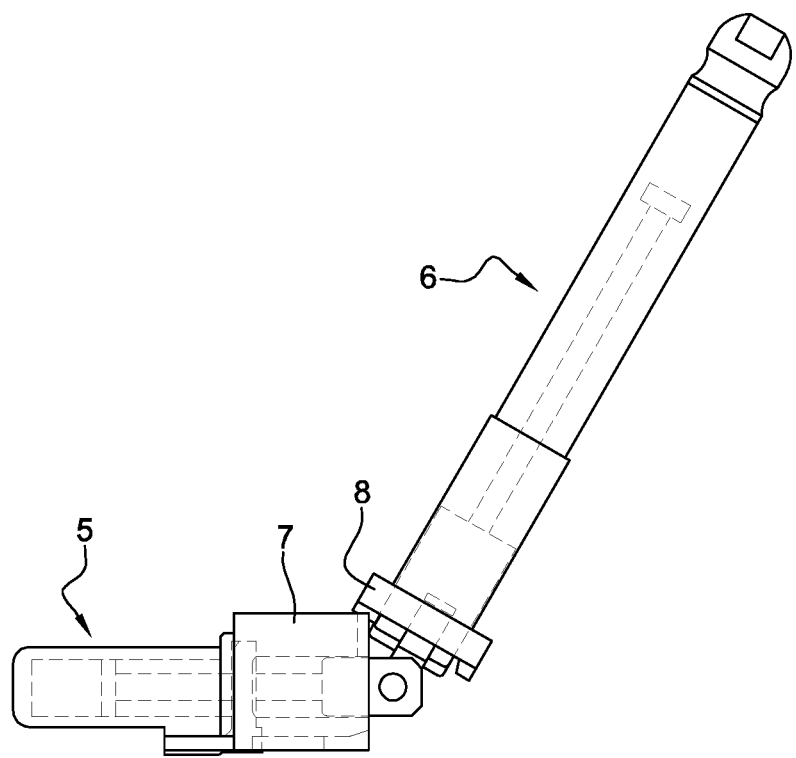
Figure 35:
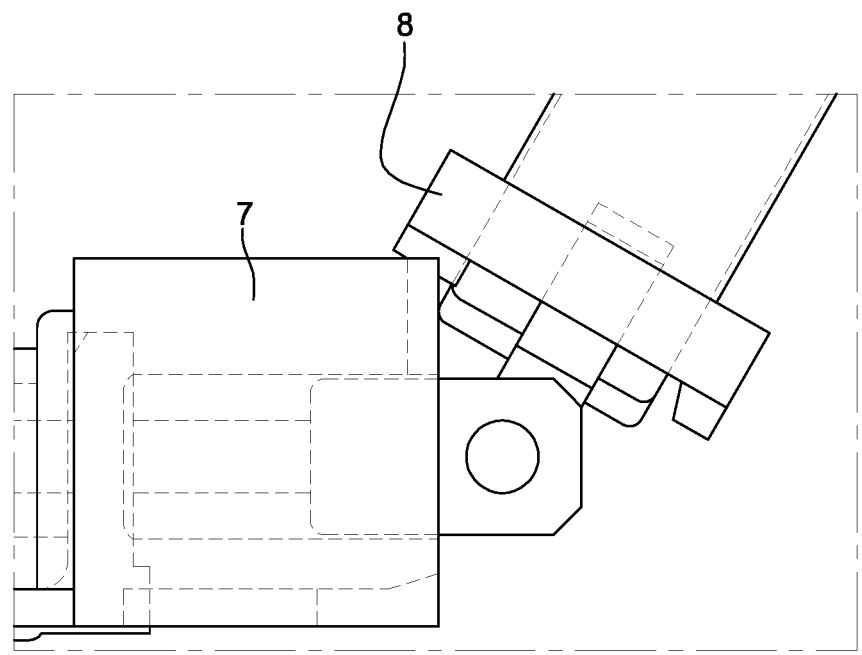
Figure 36:
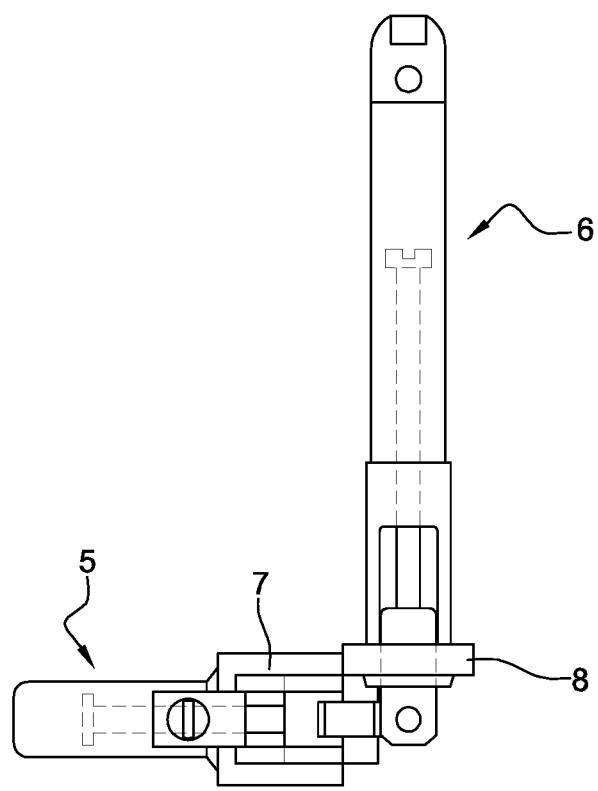
Figure 37:
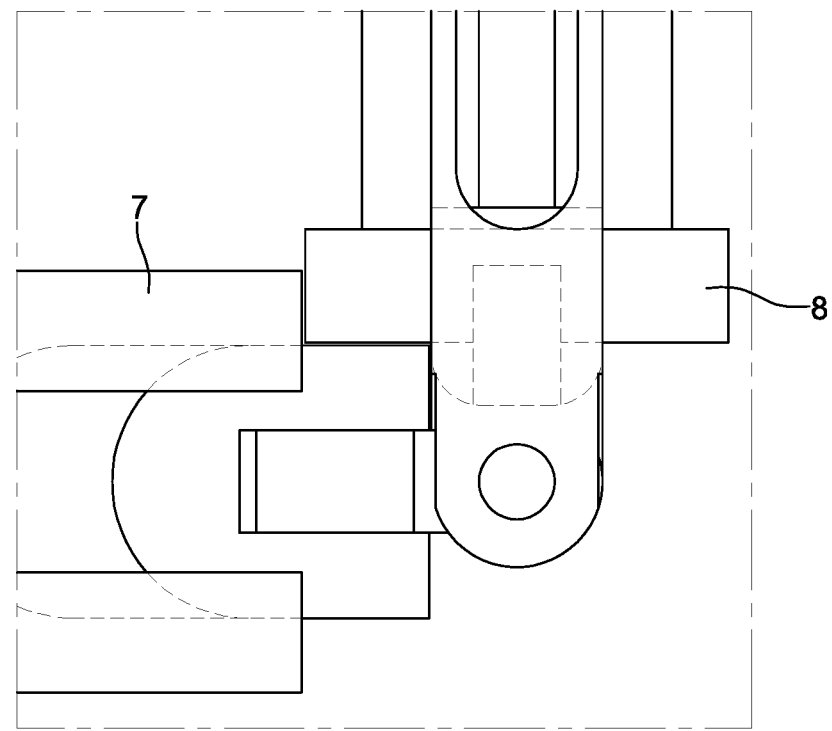

Finally, the angular motion of the attachment member of the temple with respect to that of the front face has been shown in relation with FIGS. 34 and 35 in the context of the displacement of the temple in the vertical plane, according to the terminology adopted in the context of the present description. Here again, the instability of the illustrated angular motion can be observed, whether said motion occurs upwards or downwards. Such an instability results on the one hand from the cooperation of an edge of the terminal face of the attachment member of the front face with the planar surface of the terminal face of the attachment member of the temple and, on the other hand, from the action of the springs in addition to the connection of the corresponding hinging members.

One can clearly see the advantage of the present embodiments, which simply but efficiently provides a large number of degrees of liberty of the temples with respect to the front face of a spectacle frame, both optimizing the wearer's comfort and optimizing such a frame to avoid the consequences of shocks and other deformations. Further, the wearer's comfort is increased, due to a greater adaptability of such a frame to the different wearer morphologies. Finally, there is an increased stability of the operational positions of the frame, respectively in worn mode and in folded mode.

The invention claimed is:

1. A spectacle frame comprising a front face for supporting lenses, substantially oriented in a vertical plane when said frame is being worn, and temples connected to the front face by hinges, said hinges each comprising an attachment member having first and second portions respectively rigidly connected to the front face of the frame and to the temples, each of the first and second portions of the attachment member receiving a respective hinging member having a respective free end provided with a hinge pin, said hinge pins being perpendicular to each other:
   wherein the first and second portions of the attachment members are hollow and wherein each defines a cylindrical sheath,
   wherein the hinging members each comprise a rod intended to be received in the respective sheath, one of the ends of the rod being provided with an abutment and the other end being provided with said hinge pin, each of the rods receiving a sliding ring submitted to the action of a spring bearing against the abutment, said ring being rigidly connected to the corresponding first or second portion of the attachment member near a free end of said first or second portion of the attachment member,
   wherein the hinge pins of the hinging members are rigidly connected to each other by means of a connection member.

2. The spectacle frame of claim 1, wherein the free ends of the first and second portions of the attachment members have a parallelepipedal shape.

3. The spectacle frame of claim 2, wherein opposing surfaces of said free ends of the first and second portions of the attachment members are flat.

4. The spectacle frame of claim 3, wherein the first portion of the attachment member on the front face is provided, on a lateral face of said first portion of the attachment member, starting from the free end of said first portion of the attachment member, with a recess, and wherein the second portion of the attachment member on the temple is provided with a protrusion emerging from the flat surface of the free end of the second portion of said attachment member, dimensions of said protrusion substantially corresponding to a width of said recess in order to be received in said recess on the one hand, when the temple is open, and substantially parallel to the front face when the temple is folded back.

5. The spectacle frame of claim 4, wherein the recess is formed by an elongated opening, emerging at the level of the flat surface of the free end of the first portion of the attachment member on the front face.

6. The spectacle frame of claim 1, wherein only a portion of opposing surfaces of the free ends of the first and second portions of the attachment members is flat, said surfaces respectively comprising protrusions and recesses of complementary shape capable of cooperating together.

* * * * *

UNITED STATES PATENT AND TRADEMARK OFFICE
CERTIFICATE OF CORRECTION

PATENT NO. : 11,275,258 B2  
APPLICATION NO. : 16/479039  
DATED : March 15, 2022  
INVENTOR(S) : Alexandre Sonthonnax et al.

Page 1 of 1

It is certified that error appears in the above-identified patent and that said Letters Patent is hereby corrected as shown below:

On the Title Page

At item (30), below "Apr. 25, 2017 (FR) ………………… 1753594", insert -- Feb. 13, 2017 (FR) ………………… 1751141 --.

Signed and Sealed this  
Eleventh Day of October, 2022

Katherine Kelly Vidal  
*Director of the United States Patent and Trademark Office*